United States Patent
Myreen

[15] 3,675,467
[45] July 11, 1972

[54] METHOD AND DEVICE FOR MEASURING THE TEMPERATURE OF MATERIAL IN A ROTATORY FURNACE

[72] Inventor: Bertel Myreen, Turku, Finland
[73] Assignee: Paraisten Kalkki Oy, Parainen, Finland
[22] Filed: May 27, 1970
[21] Appl. No.: 40,812

[30] Foreign Application Priority Data

June 3, 1969 Finland..................1663/69

[52] U.S. Cl..................73/351, 73/354, 73/421 B
[51] Int. Cl..................G01k 1/14, G01k 13/12
[58] Field of Search..................73/351, 354, 421 B, DIG. 9

[56] References Cited

UNITED STATES PATENTS

| | | | |
|---|---|---|---|
| 3,613,453 | 10/1971 | Small et al. | 73/351 |
| 3,379,062 | 4/1968 | Lellep | 73/351 |
| 3,025,705 | 3/1962 | Blake et al. | 136/229 X |
| R26,409 | 6/1968 | Hance | 73/359 |

FOREIGN PATENTS OR APPLICATIONS 1,109,512  4/1968  Great Britain..................73/351

*Primary Examiner*—Louis R. Prince
*Assistant Examiner*—Frederick Shoon
*Attorney*—Ralph E. Bucknam, Jesse D. Reingold, Robert R. Strack and Henry A. Marzullo, Jr.

[57] ABSTRACT

A small portion of the hot material in a rotatory furnace is poured out through an opening in the furnace wall during a period of the rotation into a measuring vessel and the temperature of the material is measured before any substantial cooling of the material has time to occur.

Transversely under the rotatory furnace are guiding rails movable between two positions. Connected to a stand on a base attached to the furnace is a device for opening and closing the furnace wall opening, and an upwardly open measuring vessel movable along the guides back and forth. In the measuring vessel are a thermocouple, an engaging dog attached to the furnace to displace the measuring vessel in synchronism with the furnace wall opening, and means for emptying the vessel before a new collection takes place.

8 Claims, 4 Drawing Figures

3,675,467

METHOD AND DEVICE FOR MEASURING THE TEMPERATURE OF MATERIAL IN A ROTATORY FURNACE

BACKGROUND OF THE INVENTION

1. Field of the Invention

The invention relates to the field of measuring the temperature of the material in a rotatory furnace, specifically to a device for measuring the temperature and to a method for measuring the temperature of the material in a rotatory furnace.

2. Prior Art

One of the most essential prerequisites for efficient control of a cement oven is the achievement of significant process data when the furnace is out of balance and this is true both with manual control as well as when analog or digital control circuits are employed. In order that such process data might be obtained, the oven must be provided with reliable measuring instruments. So far, no one has been able successfully to instrument the calcinating zone in cement furnaces. Especially in long wet ovens, in which the material has a tendency to be fed forward by jerks, it is essential to obtain information from this section of the oven.

In order to measure the temperature in the calcinating zone, up to date thermocouples installed in the furnace have been used for measuring either the gas or the material temperature, the thermoelectric E.M.F. being read after its conduction over slip rings. However, sturdy protective sockets are invariably necessary to protect the thermocouples so that these may resist the serious action of wear. However, these devices impart to the measuring system such high thermal capacity that the material temperature has no time to reach its proper value before the thermometer pocket becomes separated from the bed of material and once more it is heated by the hot gases which flush it. Even if a pocket is constructed in the inner masonry of the furnace and the thermocouple is placed in it, whereby it is embedded in material through one half revolution of the furnace, there is not enough time for the thermocouple together with its socket to acquire the true temperature of the material. The risk is also present that the pocket is not emptied of the material contained in it, and the thermocouple becomes isolated from the material and consequently inoperative.

Attempts have also been made to measure the gas temperature in the calcination zone of a cement furnace, but apart from the fact that the gas temperature is of far lesser interest than the material temperature, the measurement is also accompanied by great technical difficulties so that the results of measurement may display very great deviations from the actual values.

SUMMARY OF THE INVENTION

According to the invention a small portion of the hot material is poured out through an opening in the furnace wall during a certain period of the rotation of the furnace which naturally is less than half a period. The discharged material is collected and the temperature thereof is measured before any substantial cooling of the material takes place.

The object of the present invention is therefore to provide a method for measuring the material temperature in a rotating oven, in particular in the calcinating zone of a cement furnace, which method is free of the drawbacks and faults which have been connected with the methods of prior art already mentioned.

The invention also relates to a device for carrying out the method according to the invention, this device having an open measuring vessel with inserted thermocouple and which has been arranged for a desired period during one rotation of the furnace to be carried from a rest position to a collecting position under a hole in the oven wall, and a device for automatically opening and closing said hole in the oven wall synchronously with the movement of the measuring vessel. The thermocouple is suitably openly placed in the thermally insulated measuring vessel, whereby it has low thermal capacity and is able rapidly to assume the prevailing temperature.

The method and the device according to the present invention possess a number of advantages over previously employed methods and apparatuses. First, one measures the true temperature of the material because, since the measurement takes place outside the furnace, the hot gases in the oven cannot influence the result of measurement and since the thermocouple has no protective pocket, its thermal capacity is low, whereby the thermocouple is rapidly heated to the temperature of the material before conduction of heat from the measuring vessel to its environment has had time to affect the results of measurement. Furthermore, it is easy to supervise the operation of the measuring device because no parts of the equipment are located inside the oven where they are not under inspection. No vital parts rotate along with the oven, and they may therefore be removed from service for repairs at any time without detriment to the operation of the oven. Since the temperature measurement is carried out outside the oven, no slip ring transfer of the measuring signal is necessary; a simple millivoltmeter may therefore be used as the instrument indicating and recording the material temperature. This is a great advantage especially if the measuring signal has been incorporated in an automatic control circuit, because the slip ring trouble, which is rather highly common in factory conditions, is completely eliminated. Finally, the measuring vessel simultaneously operates as the sampling vessel for oven material, e.g. for purposes of chemical analysis.

The quantities of material removed from the furnace at measurement are negligible, and they may be returned to the oven if desired, e.g. immediately after the measurement or intermittently together with recirculated dust or together feeding the furnace. It is not necessary either, at normal operation, to perform continuous measurements; the material quantities removed can be reduced in this way, as can also the wear of the measuring equipment.

It is an apparent drawback of the method according to the invention that the measuring pulse is not continuous and that it is instead obtained in the form of discrete values with certain intervals depending on the rotation of the oven and on the time constant of the measuring vessel. It is entirely possible, however, to maintain a measuring frequency which is normally considerably above the oscillation frequency of process disturbances, and consequently it lacks practical significance.

DESCRIPTION OF THE DRAWINGS

In the drawing,

FIG. 1 shows a cross section of a rotating oven and a total view of a measuring device according to the invention, while

DESCRIPTION OF THE PREFERRED EMBODIMENT

Figure 1:
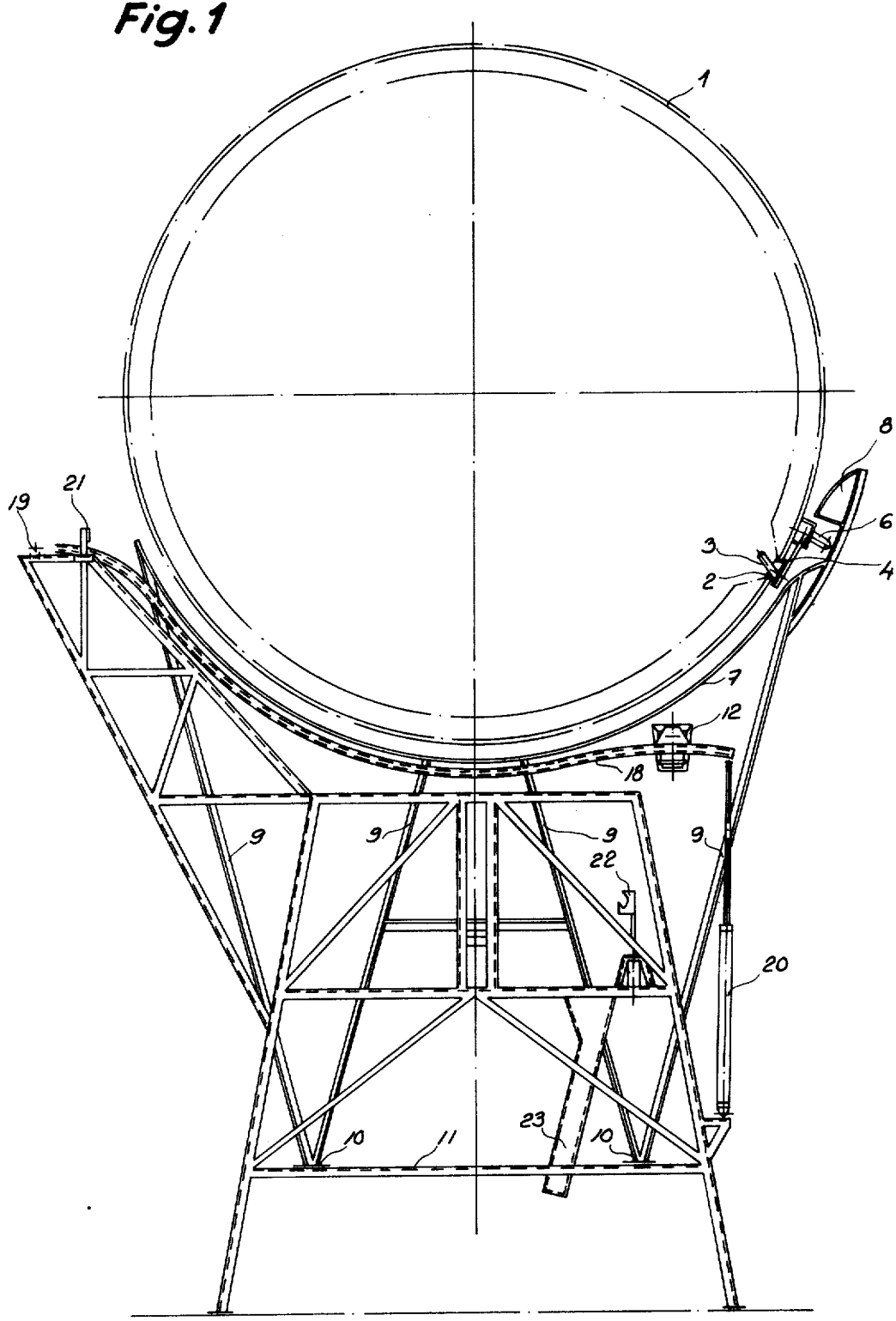

In FIG. 1 reference numeral 1 indicates a rotating oven. In its mantle numeral 2 designates an opening which is in the closed position. Plug 3 is capable of opening. The plug has been mounted on a lever 4 turnable around 5, another lever arm 6, which forms a substantially right angle with lever arm 4, being rigidly connected with the latter's turning axis. The plug 3 is normally kept in closed position by spring action.

For the purpose of opening the plug, an opening rail 7, which is concentric with the outer mantle of the oven, has been mounted in such position under the oven 1 that in the course of rotation of the oven this rail is hit by the lever arm 6. The arm is thereby turned, resulting in an outward swing of the plug 3, the length of the rail determining the opening time. The rail 7 is appropriately provided with a portion 8 causing a first, brief opening of the plug 3, the jolt caused by closure of the plug being intended to remove potential deposits which might plug the opening 2, before the plug is once more opened by action of the rail 7 for sampling of material. The rail 7 is carried by arms 9, which are turnably carried at 10 in a stand 11 so that with the aid of a power cylinder (not depicted) the rail can be turned to one side around 10 into inactive position, in which it is not contacted by the lever arm 6.

Figure 2:
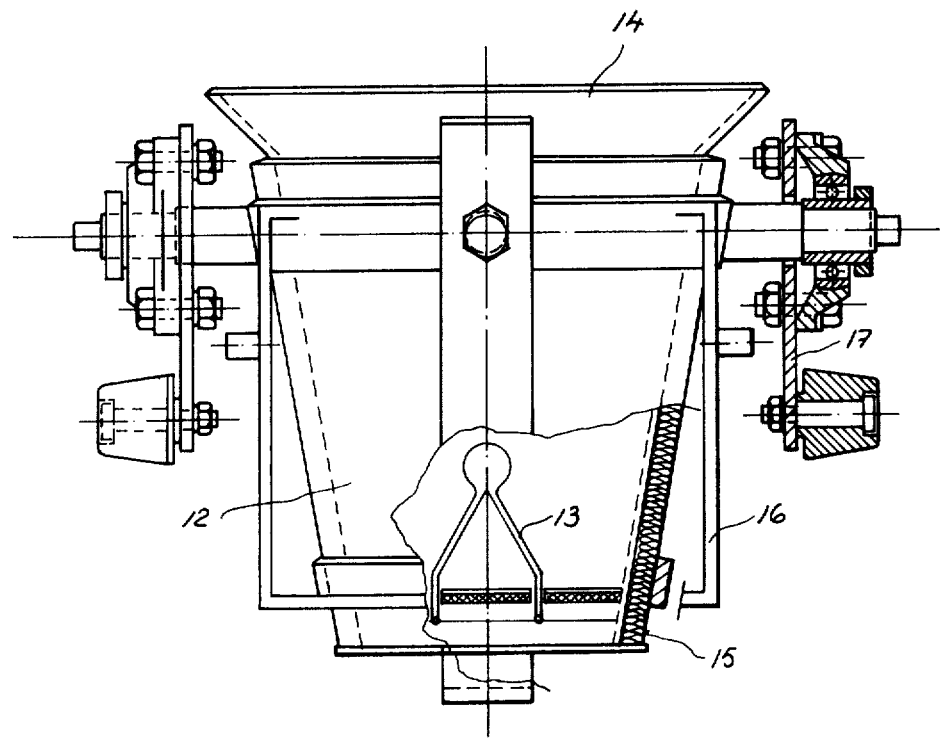
FIG. 2 shows a measuring vessel belonging to the device.
Figure 3:
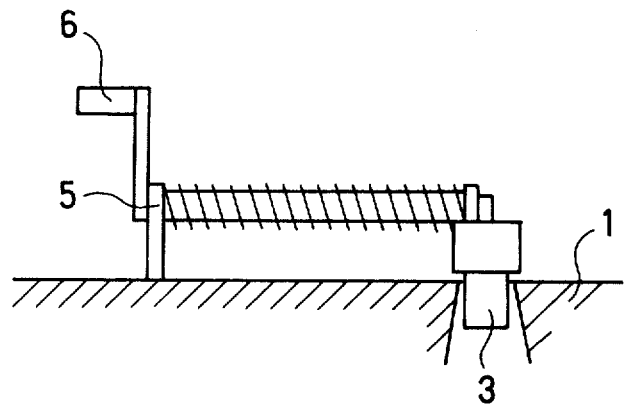
FIG. 3 shows a front-view of a plug with the lever arm.
Figure 4:
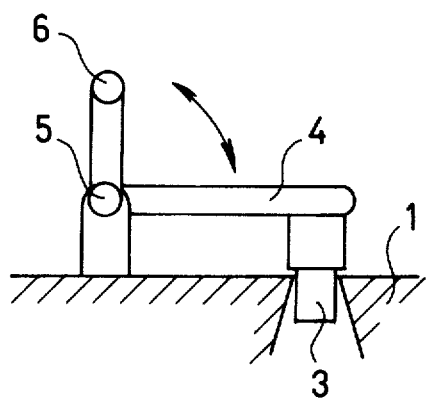
FIG. 4 shows a similar plug from the side.

For collecting the material which runs out through the opening 2 in the course of the oven's rotation, a vessel 12 has been provided, which simultaneously acts as measuring vessel and for this purpose it is provided with an exposed temperature sensor 13 (FIG. 2); this sensor may be, for instance, a nickel vs. chromenickel thermocouple connected by a flexible lead to an indicating instrument (not depicted). The collecting and measuring vessel 12 has preferably the shape of a frusto-conical cone, with a wider top than bottom in order to facilitate emptying, and in the embodiment shown in FIG. 2, it is provided with a flatter conical collar 14 around its mouth and with a thermally insulating jacket 15. The measuring vessel 12 is mounted in a holder 16, which is turnably carried in a carriage 17. The carriage 17 has been arranged to run on rolls along guides 18 consisting of U-beams turned to face each other. The guides 18 shaped so as to run in their principal part concentrically with the outer mantle of the oven 1, and they turnably pivoted at 19 to the stand 11 and can be moved, by means of a power cylinder 20 connected to the free end of the guides, between the collecting position, shown in the figure, and a lower emptying position.

When the guides 18 are in the position shown in the figure, with the vessel 12 close to their free end, the plug 3 which has been placed in its opened position acts as engaging dog and takes the vessel 12 along, with the result that during the time material runs out through the opening 2, the vessel is in collecting position under the opening. When the measuring vessel has arrived at the upper end position, it engages with a locking device 21, which fixes the measuring vessel so that it remains stationary in said position for the period in which the temperature measurement is accomplished, e.g. for three full revolutions of the oven. The opening rail 7 is kept turned into its inactive position during this period. The guides 18 are then lowered to their lower position, whereby the carriage 17 of the measuring vessel rolls down to the extreme end of the guides. This causes the measuring vessel 12 to strike against stop 22, whereby it is tipped upside down and the contents run down into a chute 23 to be recovered. Stop 22 serves the function of causing the measuring vessel 12 to be emptied. The opening rail 7 is then turned back into operating position and the guides 18 are raised into collecting position for another measuring cycle.

Control of the moving parts in the system can be easily automated by conventional means so that the device will carry out consecutive measuring cycles at desired intervals, but it is obviously equally possible to provide for such control that the equipment is started by hand for performing only one measuring cycle, every time the result of measurement is desired.

What is claimed is:

1. A method of measuring the temperature of material in a rotatory furnace operated at elevated temperature, at intervals comprising:
    first pouring a small portion of the hot material out through an opening in the furnace wall during a period of the rotation of the furnace;
    moving a separate measuring vessel together with the furnace wall during said period of rotation of the furnace;
    collecting the discharged material in said separate measuring vessel; and
    then measuring the temperature of the collected material in the vessel before any substantial cooling of the material has time to occur.

2. A device for measuring the temperature of material in a rotatory furnace operating at elevated temperature, comprising:
    a. a base;
    b. a stand on the base;
    c. first and second guiding means attached to the stand transversely beneath the furnace;
    d. a device attached to the furnace for opening and closing an opening in the furnace wall and guided by the first guiding means;
    e. an upwards open measuring vessel movable along the second guiding means from a rest position to a collecting position under the furnace wall opening for the duration of a desired period during one revolution of the furnace;
    f. a temperature sensing element in the measuring vessel;
    g. means on the stand for emptying the measuring vessel after the temperature of the collected hot material has been measured by the temperature sensing element; and
    h. means on the furnace for moving the measuring vessel along said second guiding means in synchronism with the furnace wall opening.

3. A device as recited in claim 2, in which the temperature sensing element comprises an exposed thermocouple placed in the measuring vessel to be in direct contact with the collected material.

4. A device as recited in claim 2, in which the device for opening and closing the furnace wall opening comprises:
    a turnably pivoted two-armed bell crank, which is springloaded to maintain the furnace in a normally closed position; and
    a closing plug for opening in the furnace wall mounted on the other arm of the bell crank which is arranged in the course of rotation of the furnace to engage with the guiding means for opening the plug and for maintaining the plug in open position.

5. A device as recited in claim 4, in which the first guiding means comprises a guide rail having a short front portion for accomplishing a brief premature opening and closing movement of the plug before this is again opened for collecting hot material from the furnace.

6. A device as recited claim 5, which comprises means for moving the guide rail into an inoperative position out of engagement with the bell crank lever.

7. A device as recited in claim 4, in which the second guiding means for guiding the measuring vessel are movable between a rest position and collecting position and the means for moving the measuring vessel in synchronism with the furnace wall opening comprises an engaging dog on the furnace arranged to displace the measuring vessel along the second guiding means into position under the opening in collecting position of the guiding means.

8. A device as recited in claim 7, in which the engaging dog consists of the closing plug in its opened position.

* * * * *